United States Patent
Pigouche et al.

(10) Patent No.: US 10,416,534 B2
(45) Date of Patent: Sep. 17, 2019

(54) METHOD FOR ACQUISITION OF IMAGES BY A SPACE OR AIRBORNE OPTICAL INSTRUMENT WITH WIDE FIELD OF VIEW

(71) Applicant: THALES, Courbevoie (FR)

(72) Inventors: Olivier Pigouche, Grasse (FR);
Jean-Michel Gaucel, Mandelieu (FR);
Arnaud Liotard, Grasse (FR)

(73) Assignee: THALES, Courbevoie (FR)

( * ) Notice: Subject to any disclaimer, the term of this patent is extended or adjusted under 35 U.S.C. 154(b) by 425 days.

(21) Appl. No.: 15/344,753

(22) Filed: Nov. 7, 2016

(65) Prior Publication Data
US 2017/0134671 A1    May 11, 2017

(30) Foreign Application Priority Data

Nov. 6, 2015    (FR) ...................................... 15 02339

(51) Int. Cl.
*G03B 15/00*    (2006.01)
*G06T 1/00*    (2006.01)
*B64D 47/08*    (2006.01)
*H04N 5/225*    (2006.01)
(Continued)

(52) U.S. Cl.
CPC ........... *G03B 15/006* (2013.01); *B64D 47/08* (2013.01); *G06T 1/0007* (2013.01); *H04N 5/2258* (2013.01); *B64C 2201/127* (2013.01); *G01C 11/025* (2013.01); *G06T 2207/10032* (2013.01); *H04N 5/347* (2013.01)

(58) Field of Classification Search
None
See application file for complete search history.

(56) References Cited

U.S. PATENT DOCUMENTS

| | | | |
|---|---|---|---|
| 7,136,726 B2 * | 11/2006 | Greenfeld | F41G 5/14 701/3 |
| 9,304,305 B1 * | 4/2016 | Paul | G02B 15/163 |
| 2001/0019361 A1 | 9/2001 | Savoye | |

(Continued)

FOREIGN PATENT DOCUMENTS

EP    3 013 047 A1    4/2016

OTHER PUBLICATIONS

Contributors, HowStuffWorks.com. "What Is the Difference between CCD and CMOS Image Sensors in a Digital Camera?" HowStuffWorks, HowStuffWorks, Apr. 1, 2000, electronics.howstuffworks.com/cameras-photography/digital/question362.htm. (Year: 2000).*

*Primary Examiner* — Justin P. Misleh
(74) *Attorney, Agent, or Firm* — Baker & Hostetler LLP

(57) ABSTRACT

A method for the acquisition of images by a spacer airborne optical instrument, comprises the following steps: a) acquisition, by the instrument, of a first image having a first field of view including the projection on the ground of the optical axis of the instrument and delimited by a first field edge, the first image being sampled spatially with a first sampling step; b) acquisition, by the same instrument, of a second image having a second field of view not including the projection on the ground of the optical axis of the instrument and extending beyond the first field edge, the second image being sampled spatially with a second sampling step greater than the first sampling step. Space or airborne optical instruments and an image acquisition system for implementing the method are provided.

12 Claims, 3 Drawing Sheets

(51) Int. Cl.
*H04N 5/347* (2011.01)
*G01C 11/02* (2006.01)

(56) References Cited

U.S. PATENT DOCUMENTS

| | | |
|---|---|---|
| 2009/0245688 A1 | 10/2009 | Robinson et al. |
| 2009/0268985 A1 | 10/2009 | Wong et al. |
| 2013/0162759 A1* | 6/2013 | Alakarhu ........... H04N 5/23245 348/36 |
| 2014/0168434 A1* | 6/2014 | Gerlach ................ H04N 7/183 348/144 |
| 2015/0022662 A1* | 1/2015 | Greenfeld .............. G03B 37/02 348/144 |
| 2015/0028212 A1* | 1/2015 | Wright ..................... G01J 5/08 250/340 |

\* cited by examiner

METHOD FOR ACQUISITION OF IMAGES BY A SPACE OR AIRBORNE OPTICAL INSTRUMENT WITH WIDE FIELD OF VIEW

CROSS-REFERENCE TO RELATED APPLICATIONS

This application claims priority to foreign French patent application No. FR 1502339, filed on Nov. 6, 2015, the disclosure of which is incorporated by reference in its entirety.

FIELD OF THE INVENTION

The invention relates to a method for the acquisition of images by a space or airborne optical instrument, and to an optical instrument and an image acquisition system for implementing such a method.

BACKGROUND

The extent of the field of view of a space optical instrument is limited by the laws of optics. In effect, the performance levels of an optical instrument are optimal in the direction of its optical axis (generally directed towards the nadir point) and degrade with distance away from this direction; beyond a certain angle, the quality of the image becomes insufficient. Thus, the coverage of extended regions of the Earth's surface using low orbit observation satellites can be performed only by means of multiple passes. Similar remarks apply to the case of an airborne instrument.

The document US 2001/0019361 describes a camera intended to operate with low light levels, having a central field of view and a peripheral field of view with lesser spatial resolution.

SUMMARY OF THE INVENTION

The invention aims to overcome this drawback by proposing a multi-resolution image acquisition method with extended field of view. For this, the inventors stated from the observation that, in many applications, such as maritime surveillance for example, the extent of the field of view is greater than the spatial resolution. Thus, the invention proposes to widen the field of view of a spatial instrument by degrading the spatial resolution on the edges of the image.

A subject of the invention is therefore a method for the acquisition of images by a space or airborne optical instrument, comprising the following steps:

a) acquisition, by means of said instrument, of a first image having a first field of view comprising the projection on the ground of the optical axis of the instrument and delimited by a first field edge, said first image being sampled spatially with a first sampling step;

b) acquisition, by means of this same instrument, of a second image having a second field of view extending beyond the first field edge, said second image being sampled spatially with at least one second sampling step, said or each said second sampling step being greater than said first sampling step.

According to particular embodiments of such a method:

Said first sampling step can be chosen so as to define a first Nyquist spatial frequency such that the modulation transfer function of the instrument, or a figure or merit proportional to said modulation transfer function, at said first Nyquist frequency, is greater than or equal to a predefined threshold over all said first field of view; and said or each said second sampling step is chosen so as to define at least one second Nyquist spatial frequency such that said modulation transfer function, or said figure of merit, at said or at each said second Nyquist frequency, is also greater than or equal to said predefined threshold over all said second field of view.

Said step b) can comprise the followings substeps:
b1) acquisition of said second image, sampled with a sampling step equal to that of said first image;
b2) downsampling of said second image.

In this case, said first and second images can be acquired by means of pixelated sensors having pixels of the same dimensions, corresponding to the first sampling step, the downsampling of said second image being obtained by a post-acquisition signal processing.

As a variant, said first and second images can be acquired by means of pixelated sensors having pixels of different dimensions, the pixels of the sensor or sensors used for the acquisition of the second image having dimensions greater than those of the pixels of the sensor or sensors used for the acquisition of the first image, whereby the downsampling of said second image is obtained at the same time as the acquisition thereof.

Said second field of view can surround said first field of view.

Said steps a) and b) can be implemented on board said spacecraft, the method also comprising a step of transmission to the ground of the samples forming said first and second images. In this case, the method can also comprise the following steps, implemented on the ground:
c) upsampling of said second image with a third sampling step equal to said first sampling step,
d) obtaining, from said first image and from the upsampled second image, of a single image having a uniform sampling step and comprising a first region corresponding to said first image and a second region corresponding to the part of said second image which is not superimposed on said first image.

Another subject of the invention is a space or airborne optical instrument for the acquisition of images, comprising: an image-forming optical system; a sensor or set of sensors for acquiring the images formed by said optical system; and a processor for processing the images acquired by said sensor or set of sensors; characterized in that these elements are configured to implement such a method. The sensors can notably be of CMOS type and said processor can be at least partly co-integrated with said or at least one of said sensors.

Another subject of the invention is a space or airborne optical instrument for the acquisition of images comprising: an image-forming optical system; and a set of pixelated sensors for acquiring the images formed by said optical system; characterized in that: these elements are configured to acquire, by means of one or more first sensors of said set, a first image having a first field of view comprising the projection on the ground of the optical axis of the instrument and delimited by a first field edge and, by means of one or more second sensors of said set, a second image having a second field of view extending beyond the first field edge; and in that: the pixels of the second sensor or sensors have dimensions greater than those of the pixels of the sensor or sensors used for the acquisition of the first image.

Yet another subject of the invention is an image acquisition system suitable for implementing a method as mentioned above, comprising:

a space or airborne segment comprising an optical instrument as mentioned above, and a transmission device suitable for transmitting to the ground, samples forming a first image and a second image acquired by said instrument, said second image having a field of view extending beyond an edge of the field of view of the first image and being sampled spatially with at least a sampling step greater than that of the first image; and a ground segment comprising a reception device suitable for receiving said samples and a data processing system suitable for: upsampling said second image to a sampling step equal to that of the first image, obtaining, from the first image and from the upsampled second image, a single image having a uniform sampling step and comprising a first region corresponding to said first image and a second region corresponding to the part of said second image which is not superimposed on said first image.

BRIEF DESCRIPTION OF THE DRAWINGS

Other features, details and advantages of the invention will emerge on reading the description given with reference to the attached drawings given by way of example and which represent, respectively.

DETAILED DESCRIPTION

The invention will be described with reference to the case of a space instrument, but it applies equally to an airborne instrument.

Figure 1A:
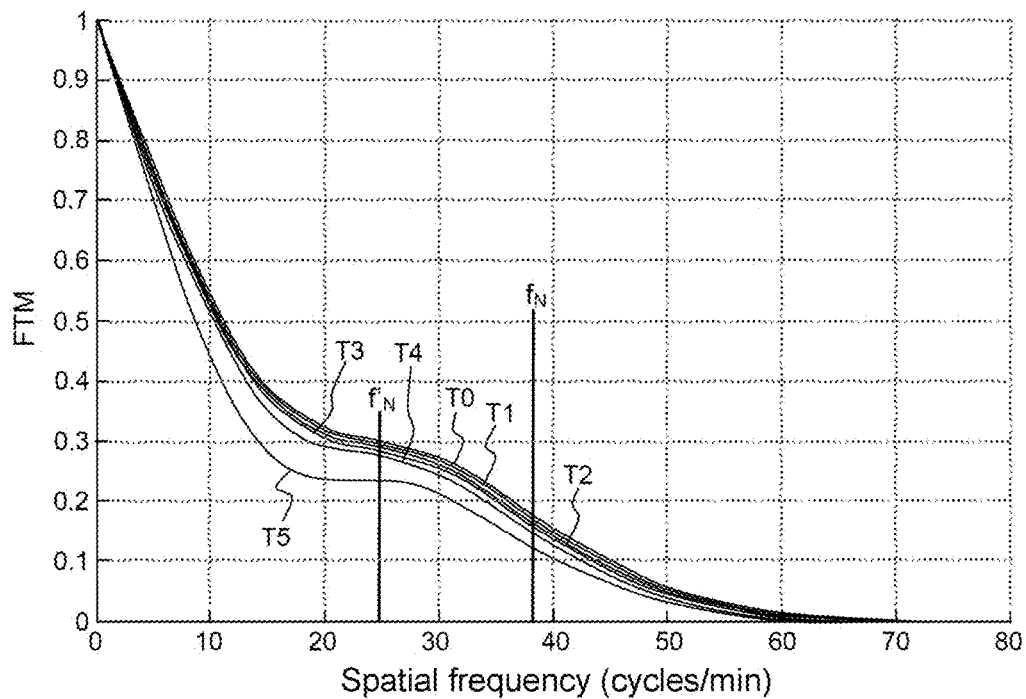
FIGS. 1A and 1B, graphs of the tangential and sagittal modulation transfer functions of an optical instrument for different observation directions relative to the optical axis.
Figure 1B:
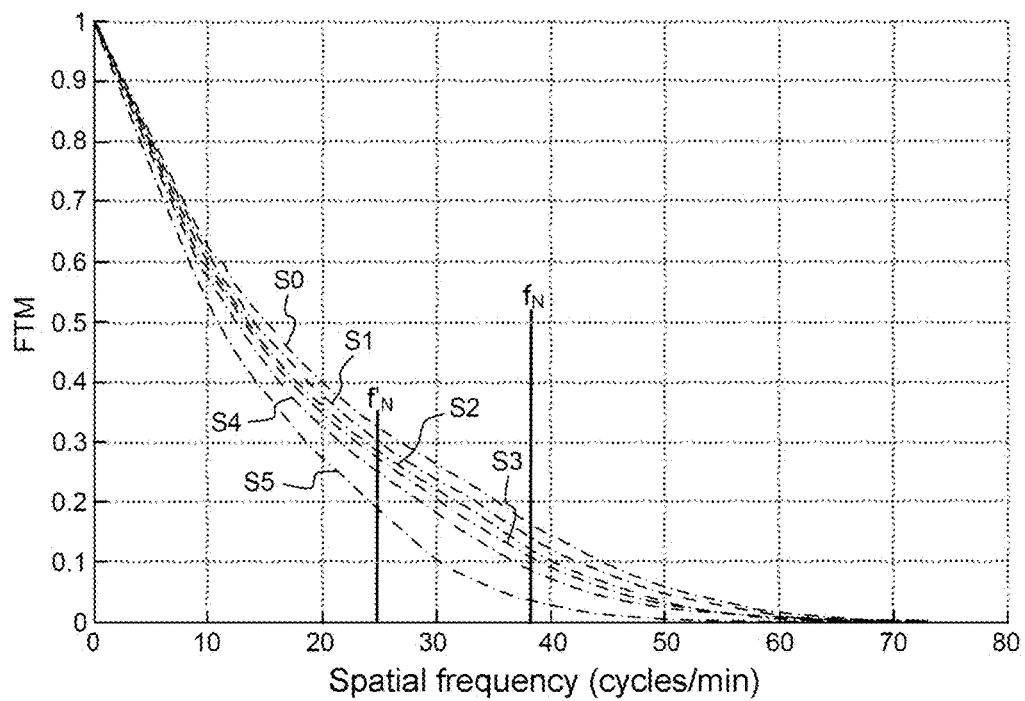

FIG. 1A shows graphs of the tangential modulation transfer function (FTM), expressed as a function of the spatial frequency, for a space optical instrument; the curve T0 corresponds to the tangential FTM measured for an object situated on the optical axis of the instrument; the curves T1-T5 correspond to increasing values of the angle formed by the direction of the object point and the optical axis (0.87°, 1.31°, 1.52°, 1.74° and 1.96° respectively). FIG. 1B shows the corresponding graphs S0-S5 of the sagittal FTM.

Both in the tangential and sagittal cases, the FTM has the value 1 for a zero spatial frequency (that emerges from the very definition of FTM), and decreases monotonically when the spatial frequency increases. The decrease is all the more rapid when the angle between the direction of the object point and the optical axis is great. That reflects the fact that the images are all the less clear as distance increases from the centre of the field of view.

An image formed by an optical system is generally acquired by a pixelated sensor, which can typically be of charge coupling type (CCD, or charge-coupled device) or CMOS type, which produces a spatial sampling. In the figures, the reference $f_N$ designates the Nyquist frequency associated with this sampling which, in the interests of simplicity, is considered identical in the sagittal and tangential directions although that is not necessarily the case in practise. Conventionally, the limit of the "useful" visual field is set such that the modulation transfer function at the Nyquist frequency is greater than or equal to a predefined threshold TH (here again, a threshold is considered identical in both directions although that is not essential). Thus, for example, in the case of FIGS. 1A and 1B, a Nyquist function of 38 cycles/mm and a threshold TH=0.13 are considered. In these conditions, the field width, delimited by the sagittal FTM, is approximately 0.87°. Sometimes, the threshold is not defined directly for the FTM, but for a figure of merit which is proportional to it, for example the product of the FTM and of the signal-to-noise deviation; that does not fundamentally change the principle of the invention.

An idea on which the invention is based is that the limit of the visual field can be pushed back to greater angles provided that the Nyquist frequency is lowered. Thus, for example, if a Nyquist frequency $f'_N$ of 27 cycles/mm is taken, the width of the visual field which makes it possible to observe the criterion $FTM(f'_N) \geq TH$ reaches 1.96°.

More specifically, the invention proposes acquiring two partial images:

a first image, spatially sampled finely, with a Nyquist frequency $f_N$, and corresponding to a "central" visual field (0°-0.87° in the case of the example), including the projection on the ground of the optical axis of the instrument (corresponding to an angle of 0°) and extending to a first field edge (circle at 0.87° in the example) which corresponds to the threshold condition $FTM(f_N)=TH$; and at least one second image sampled spatially less finely, with a Nyquist frequency $f'_N < f_N$, and corresponding to an "extended" or "peripheral" visual field which extends beyond the first field edge and to a second field edge (0.87°-1.96° in the case of the example). Preferably, this second image does not include the projection on the ground of the optical axis of the instrument.

The second Nyquist frequency $f'_N$ is chosen such that the FTM (or the figure of merit) is greater than the threshold TH in the second image, for example that the threshold condition $FTM(f'_N)$ is satisfied corresponding to the second field edge.

The threshold conditions can be imposed for the tangential FTM only, or for the sagittal FTM only, or even for both FTMs at the same time, with a same threshold or different thresholds. The same applies if a figure of merit proportional to the FTM is used.

It is also possible to acquire more than two partial images with decreasing Nyquist frequencies, and therefore spatial resolutions that are increasingly less good with distance away from the optical axis (for memory, the spatial resolution on the ground is given by the sampling step in the focal plane multiplied by the altitude of the satellite and divided by the focal length of the instrument).

Advantageously, the partial images can correspond to adjacent regions of the Earth's surface, so as to form a continuous composite image. In practise, there can be a partial overlap between partial images, which is eliminated in the construction of the composite image.

Figure 2:
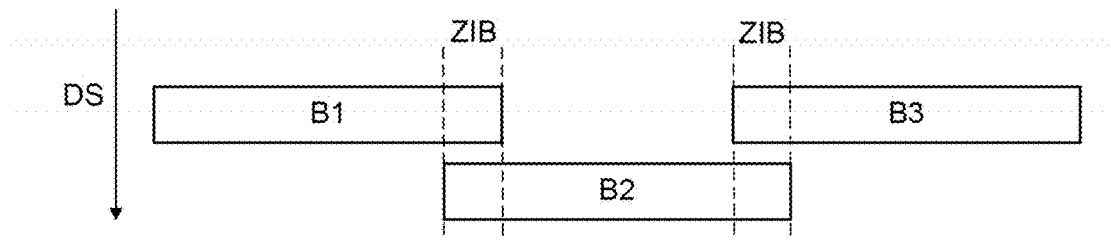
FIG. 2, a diagram of a system of sensors for the implementation of a method according to an embodiment of the invention.

Very often, the space optical instruments acquire images line by line, in a direction at right angles to the direction of advance of the satellite, by means of strip-type detectors. The movement of the satellite makes it possible to acquire two-dimensional images by scanning in said direction of advance. FIG. 2 illustrates such an arrangement, in the case of a detector with three strips B1, B2 and B3 which are slightly offset in the direction of advance of the satellite (opposite the direction DS of movement of the ground) and slightly overlap (areas between strips ZIB) to avoid coverage gaps. By way of example, the central strip B2 can be used to acquire the first partial image, corresponding to the central region of the visual field, and the lateral strips B1, B3 to acquire two partial images with reduced resolution corresponding to lateral regions of the visual field. According to the prior art, only the first partial image would be acquired (it must however be understood that the representation of FIG. 2 is simplified, in reality several strips will generally be used to acquire each partial image).

The downsampling of the lateral partial images could be obtained by using strips B1, B3 having pixels of greater dimensions than those of the strip B2. However, it is generally preferable to use identical strips and reduce the spatial resolution of the strips B1 and B3 by proceeding with a downsampling of the images. This downsampling can be performed, for example, by grouping together adjacent pixels (binning), which imposes the use of an integer ratio $f_N/f'_N$. More generally, it is possible to proceed with a spatial filtering in the focal plane followed by a downsampling, which makes it possible to dispense with this constraint. It is even possible to use a downsampling step in the focal plane that is variable, preferably continuously; the lateral partial images then have several different sampling steps, all greater than that of the central partial image. The idea is to have the Nyquist frequency reduce as the field edge is approached such that the FTM or the figure of merit is always greater than, but also as close as possible to, the threshold TH. In this case, there must be a re-sampling on the ground making it possible to revert to a constant step to exploit the final image.

It may be advantageous to use detecting strips of CMOS type, because it is then possible to co-integrate spatial downsampling electronics, even also other electronic functions (filtering, analogue-digital conversion, etc.).

The downsampling of the images acquired by the strips B1 and B3 is preferentially performed on board the satellite (more generally the spacecraft, and even more generally the carrier—spacecraft or aircraft in the case of an airborne instrument, on which the optical instrument is embedded, in order to minimize the volume of data to be transmitted to a station on the ground, where the final composite image is reconstructed. In order for this final image to be homogeneous, and in particular exhibit a constant scale, it is necessary to upsample the partial images obtained from the strips B1, B3 so as to revert to the same sampling step as for the partial image obtained from the strip B2, which results in an enlargement exactly compensating the shrinkage introduced by the downsampling.

Figure 4:
FIG. 4, an image acquired by a method according to an embodiment of the invention.

FIG. 4 illustrates such a final composite image ImF. It is easy to distinguish the first image I1 with "high" resolution and the second image I2 with lower resolution (downsampling by a factor 4, then upsampling by a same factor). According to the prior art, only the partial image I1 would be available. Now, it is clear that the partial image I2—which also makes it possible to double the visual field—can be useful in many applications, despite its degraded resolution.

Figure 3:
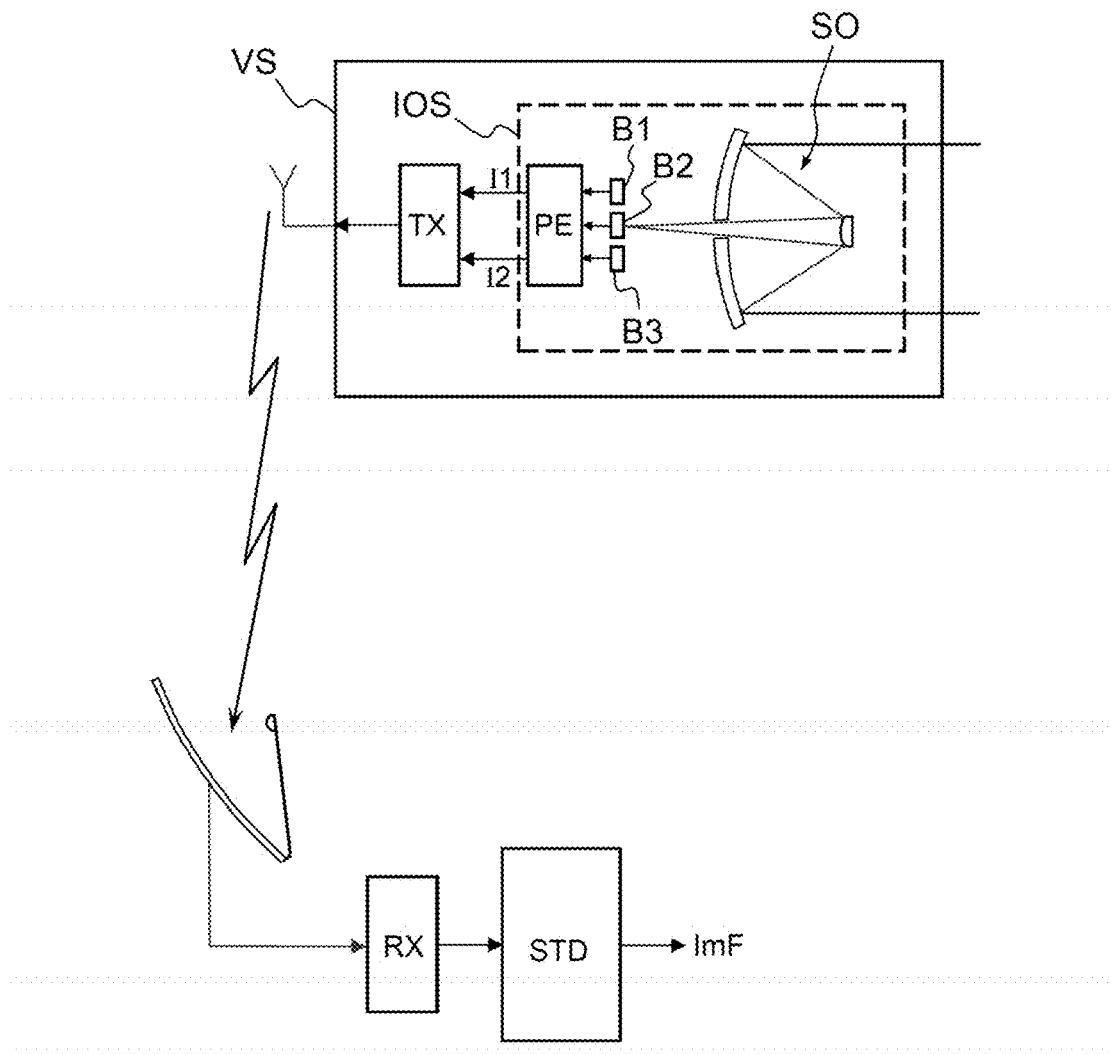
FIG. 3, a diagram of an image acquisition system according to an embodiment of the invention, comprising a satellite equipped with a space optical instrument and a station on the ground.

FIG. 3 very schematically represents an image acquisition system for the implementation of a method according to an embodiment of the invention. The space segment comprises a carrying spacecraft (typically a satellite) VS equipped with an optical instrument IOS comprising:

An image-forming optical system SO, for example a telescope. As was explained above, the invention involves an enlargement of the field of view, that must be taken into account in the design of the optical system SO. In particular, certain components, such as spectral filters, mirrors, and more generally all the components at the focal plane, will have to be adapted to this greater width of field, and will therefore have greater dimensions compared to the corresponding components in an instrument not implementing the invention. Typically, this enlargement of the components is done in a single direction, at right angles to the direction of advance of the carrier.

A set of sensors B1; B2, B3 for acquiring the images formed by said optical system (see FIG. 2).

An embedded processor PE for processing the images acquired by these sensors—in particular for downsampling the images acquired by the sensors B1 and B3, and for converting the analogue samples obtained from the sensors into digital signals. As mentioned above, this processor can be totally or partially (in particular with regard to the downsampling functions) co-integrated with one or more detectors. The term "processor" must be interpreted in the wide sense of an electronic system making it possible to process signals; it can be analogue, digital or digital-analogue hybrid. It can be a dedicated circuit or a microprocessor running a specific program, stored in a non-volatile memory.

A transmitter TX for transmitting to the ground the signals representative of the images acquired by the sensors and processed by the processor.

The processor can be absent if the downsampling is obtained at the same time as the acquisition of the lateral images by virtue of the use of sensors B1, B3 having pixels of greater dimensions than those of the strip B2.

The ground segment comprises a receiver RX for receiving the signals transmitted by the transmitter TX and a data processing system STD (typically a computer, or an IT system comprising several computers, programmed appropriately) to construct the multi-resolution final image ImF from these signals.

In the case of an airborne system, obviously, the term "airborne segment" would be used rather than "space segment".

The invention claimed is:

1. A method for acquisition of images by a space or airborne optical instrument viewing a surface of the Earth, comprising the following steps:
    a) acquisition, by means of said optical instrument, of a first image having a first field of view that comprises the surface of the Earth viewed by said optical instrument and that is delimited by a first field edge, said first image being sampled spatially with a first sampling step;
    b) acquisition, by means of said optical instrument, of a second image having a second field of view extending beyond the first field edge, said second image being sampled spatially with at least one second sampling step, each said second sampling step being greater than said first sampling step,
    wherein the first sampling step defines a first Nyquist spatial frequency such that a modulation transfer function of the optical instrument or a figure of merit proportional to said modulation transfer function, at said first Nyquist spatial frequency, is greater than or equal to a predefined threshold over all said first field of view; and
    wherein each said second sampling step defines at least one second Nyquist spatial frequency such that said modulation transfer function or said figure of merit, at each said second Nyquist spatial frequency, is greater than or equal to said predefined threshold over all said second field of view.

2. The method according to claim 1, wherein said step b) comprises the following substeps:

b1) acquisition of said second image, sampled with a sampling step equal to that of said first image;
b2) downsampling of said second image.

3. The method according to claim 2, wherein said first and second images are acquired by means of pixelated sensors, the downsampling of said second image being obtained by a post-acquisition signal processing.

4. The method according to claim 1, wherein each of said first and second images is acquired by means of one or more pixelated sensors having pixels, the pixels of the one or more pixelated sensors used for the acquisition of the second image having dimensions greater than dimensions of the pixels of the one or more pixelated sensors used for the acquisition of the first image.

5. The method according to claim 4, wherein the second image is downsampled during the acquisition of the second image.

6. The method according to claim 1, wherein said second field of view surrounds said first field of view.

7. The method according to claim 1, wherein said optical instrument is embedded on board a spacecraft and said steps a) and b) are implemented on board said spacecraft, the method also comprising a step of transmission of the samples of said first and second images to the surface of the Earth.

8. The method according to claim 7, also comprising the following steps, implemented on the surface of the Earth:
c) upsampling of said second image with a third sampling step equal to said first sampling step,
d) obtaining, from the first image and from the upsampled second image, of a single image having a uniform sampling step and comprising a first region corresponding to said first image and a second region corresponding to a part of said second image which is not superimposed on said first image.

9. A space or airborne optical instrument for the acquisition of images, comprising:
an image-forming optical system that forms images; and
one or more sensors for acquiring the images formed by said optical system;
wherein the optical instrument is configured to implement the method according to claim 1.

10. The optical instrument according to claim 9, also comprising:
a processor for processing the images acquired by said one or more sensors,
wherein said one or more sensors are of CMOS type and said processor is at least partly co-integrated with at least one of said one or more sensors.

11. The optical instrument according to claim 9, wherein the optical instrument is configured to implement the method according to claim 4.

12. An image acquisition system, said system comprising:
a space or airborne optical instrument embedded on board a spacecraft and configured to implement on board the spacecraft the method according to claim 1, the optical instrument being configured to view the surface of the Earth, for acquiring images, wherein the optical instrument comprises:
an image-forming optical system that forms images;
one or more sensors for acquiring the images formed by said optical system; and
a processor for processing the images acquired by said one or more sensors; and
a transmission device suitable for transmitting, to the surface of the Earth, the samples forming said first and second images and samples forming a third image and a fourth image acquired by said optical instrument, said fourth image having a field of view extending beyond an edge of a field of view of the third image and being sampled spatially with at least one sampling step greater than that of the third mage; and
a ground segment comprising a reception device suitable for receiving all of said samples and a data processing system suitable for:
upsampling said fourth image to a sampling step equal to that of the third image,
obtaining, from the third image and from the upsampled fourth image, a single image having a uniform sampling step and comprising a first region corresponding to said third image and a second region corresponding to a part of said fourth image which is not superimposed on said third image.

* * * * *